UNITED STATES PATENT OFFICE.

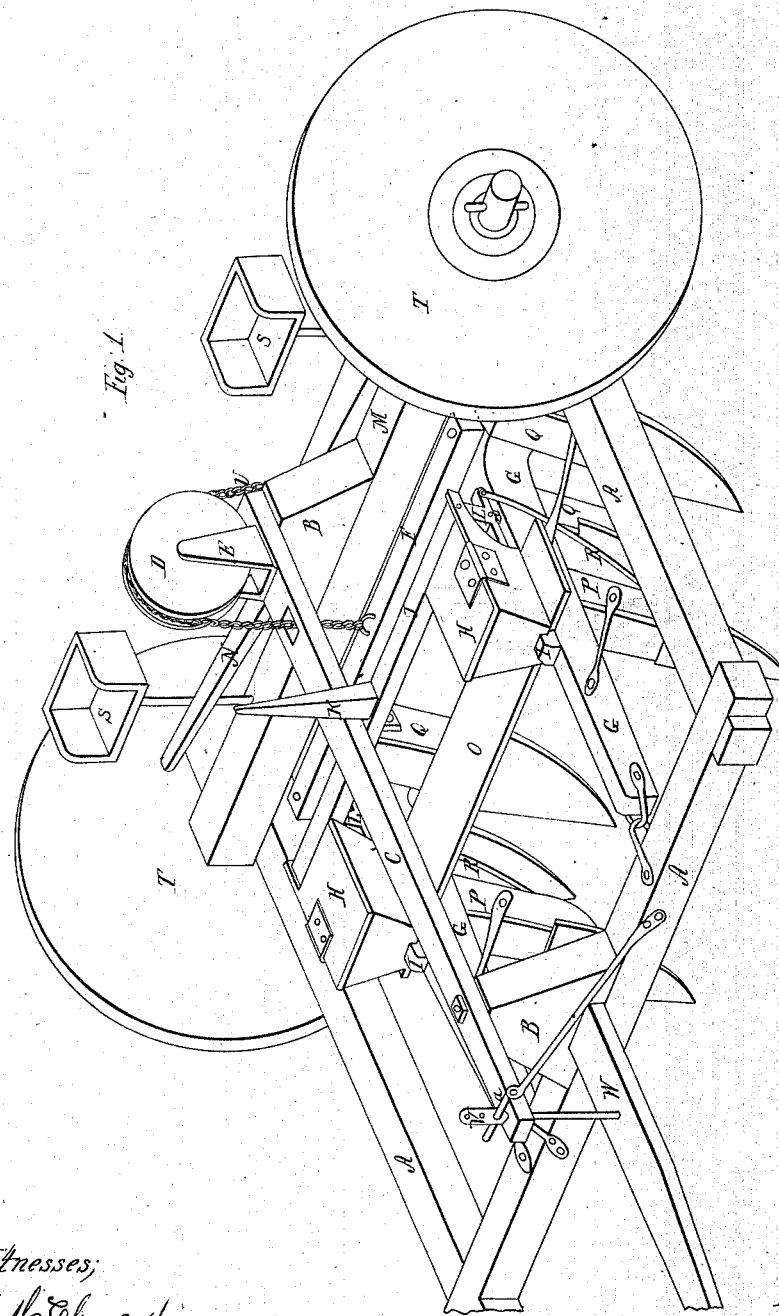

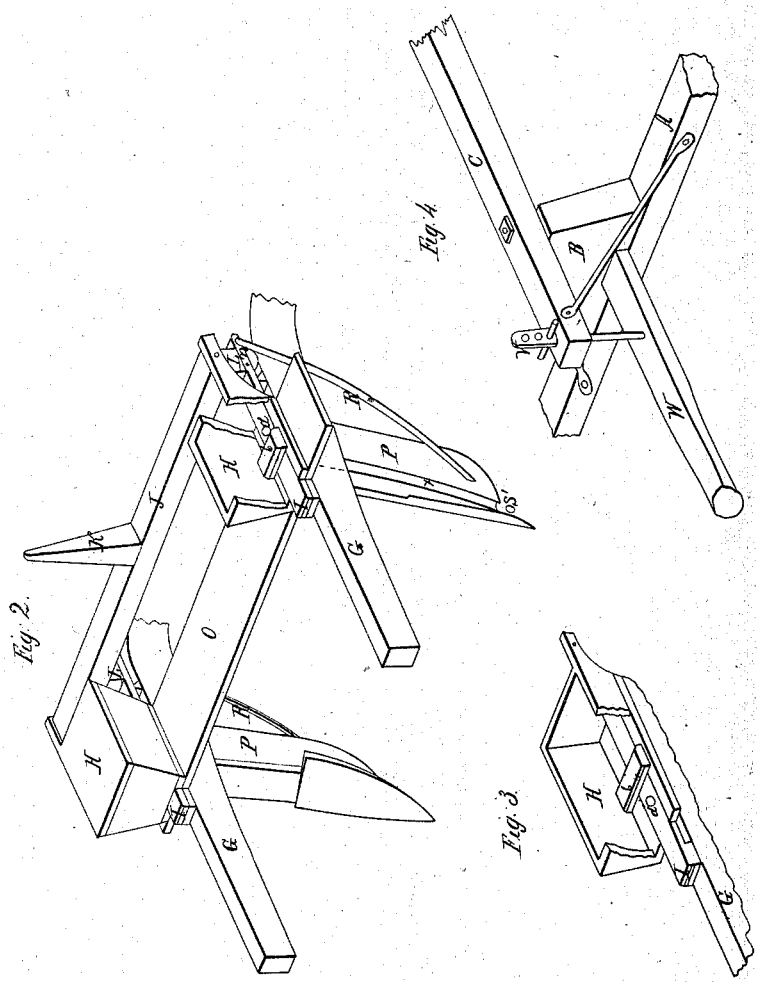

JOSEPH T. BRYAN, OF LEBANON, INDIANA.

IMPROVEMENT IN CORN-PLANTERS.

Specification forming part of Letters Patent No. 47,514, dated May 2, 1865.

*To all whom it may concern:*

Be it known that I, JOSEPH T. BRYAN, of Lebanon, in the county of Boone and State of Indiana, have invented a new and useful machine for planting corn, hilling, drilling, and plowing, called "Keystone Corn-Planter;" and I do hereby declare that the following is a full, clear, and exact description of the construction and operation of the same, reference being had to the annexed drawings, making part of this specification, in which—

Figure 1 is a perspective view; Figs. 2, 3, and 4, sectional views.

The nature of my invention consists in constructing a truck, A A A, with two wheels, T T. The axle M is placed upon that truck. Upon this axle I place a block, B, and likewise one on the front part of the truck A. On these two blocks rests the cap-rail c, which is on one end provided with a setter, V, by means of which I can lower or raise the tongue W. On the other end of the cap-rail is a E with a pulley, D, in which plays a chain. One end of this chain, U, is fastened to the cross-piece F and the other end to the tread N. By stepping on this tread N the plows can be lifted over any obstruction—such as a stump, &c.—that may come in my way. The plow is placed inside of the truck and fastened to the front piece by means of a pair of couples. The beams G G of the plow are connected and fastened together by means of the board O and the cross-piece F. On top of that board O, and immediately over the front shovel-posts, P P, is the box or boxes H H, into which the corn is put. These boxes are provided with a slide, I, in which are two apertures, d d, as shown on Figs. 2 and 3. C C are cross-pieces inside of the boxes H H, by means of which I can either shut off or permit the corn to drop into the tube x, as desired, and from there to the ground.

K is a lever, by means of which the slides I I can be moved to suit the operator. L connects the slides I I with the lever-bar J, and n is the pivot. Attached to the ends of slides I I are the rods R R, which, passing through the front shovel-posts, P P, will stop the tubes in P P and prevent the grain from dropping until it comes to the desired place. Fig. 4 shows the manner of raising and lowering the tongue W by means of the setter V. Q Q Q Q are the rear shovel-posts. S S are the seats for the driver and operator.

Operation: It will now be seen that when the machine is in operation and the corn placed into the boxes H H the operator can plow and plant corn. He can drill by taking off the rods R R and using the slides without them. He can hill the ground by closing up the front aperture, d, in slide I. These apertures d d can be so arranged as to drop any desired number of grain at the time. By taking off the board O, boxes H H, lever arrangement, and rods R R and setting the plows by means of the cross-piece F at any desired space from each other he can plow the corn. In this manner my machine will plow, plant, hill, and drill.

I claim—

1. The arrangement of the boxes H H with their slides I I and apertures d d, the cross-pieces C C, bar J, lever K, and tubes in front shovel-posts, P P, in combination with the plows Q Q Q Q P P and set-piece F for hilling.

2. The attachment of the rods R R to the machine, for the purpose of plowing and planting corn.

JOSEPH T. BRYAN.

Witnesses:
WM. L. McCHESNEY,
JNO. L. SMITHMYER.